Aug. 4, 1953 — A. A. WEISBERGER ET AL — 2,647,443
BROACHING MACHINE
Filed July 9, 1948 — 2 Sheets-Sheet 1

INVENTORS.
Arthur A. Weisberger
Robert J. Helton
BY
Atty.

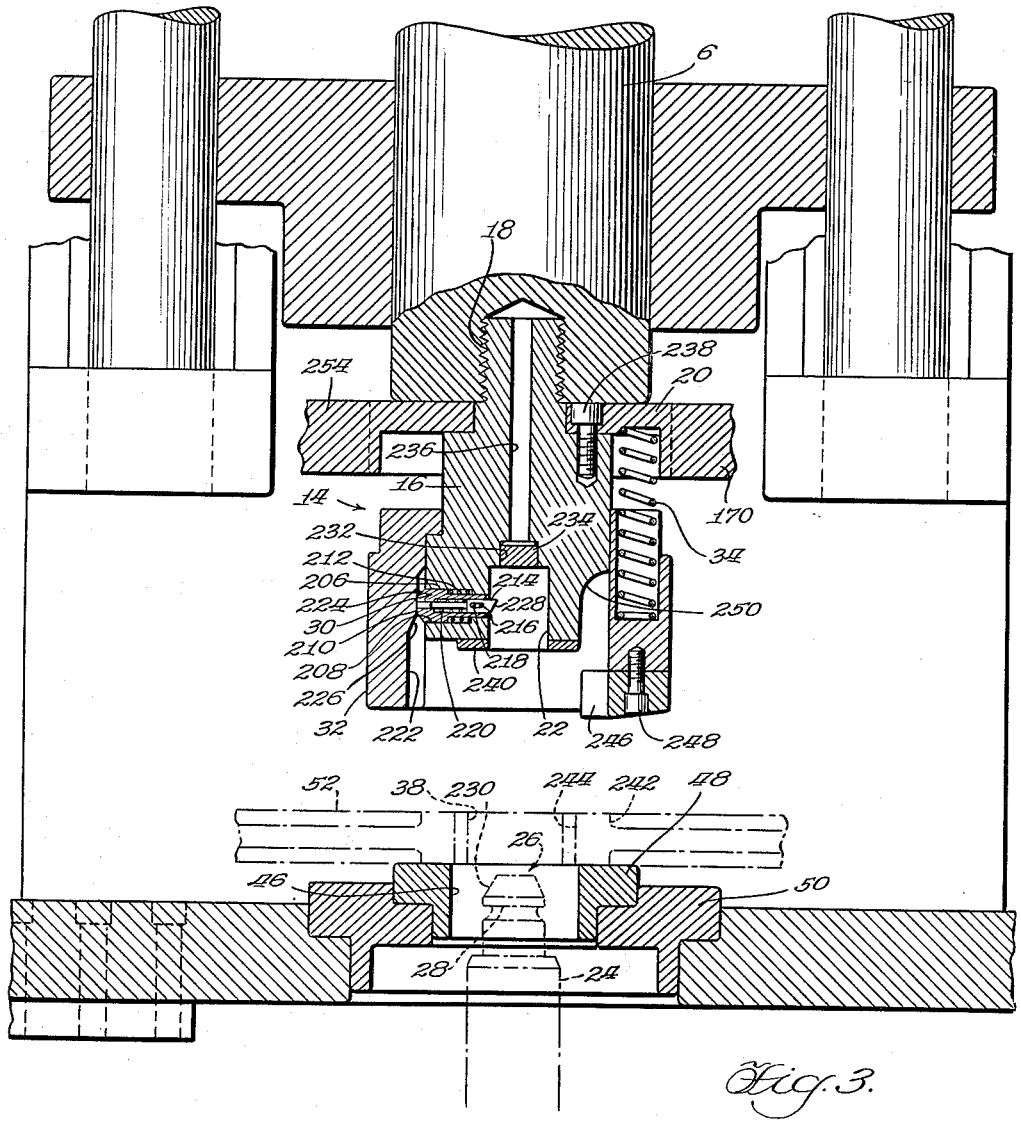
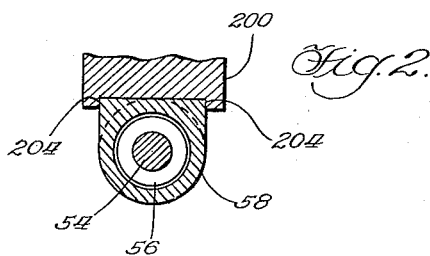

Patented Aug. 4, 1953

2,647,443

UNITED STATES PATENT OFFICE 2,647,443

BROACHING MACHINE

Arthur A. Weisberger and Robert J. Helton, Hammond, Ind., assignors to American Steel Foundries, Chicago, Ill., a corporation of New Jersey Application July 9, 1948, Serial No. 37,918

11 Claims. (Cl. 90—33)

This invention relates to machine tools and more particularly to machines, such as broaches, for forming holes in associated work pieces.

A general object of the invention is to devise a novel broaching machine particularly adapted to broach a hole in an associated work piece and then pressing a bushing in the hole without distorting the bushing.

In prior art machines of the above-described type, the bushing has been mounted on the large end of the broach to accommodate pressing of the bushing into the hole after the broach has passed therethrough. However, it has been found that due to imperceptible misalignment of the broach, the opening is frequently formed on a bias resulting in distortion of the bushing as it is pressed into the hole. This condition has resulted in the expensive and troublesome practice of grinding the bushings after assembly thereof.

Accordingly, a primary object of the present invention is to positively center the broach with respect to the work piece at all times during broaching of the hole thereby insuring a perfect fit of the bushing and consequently preventing distortion thereof.

Another significant disadvantage of prior art broaching machines of the above type has been the necessity for the operator to retrieve the broach at the end of each operation. This practice requires manual handling of the broach resulting in loss of time and in operator fatigue.

Accordingly, another object of the invention is to devise a broaching machine of the above-described type wherein manual handling of the broach is eliminated by the provision of means for retrieving the broach and re-engaging it with its actuating power device at the end of each operation.

A further object of the invention is to provide a dual purpose device for centering and retrieving the broach as above described.

Still another object of the invention is to provide a novel fluid control circuit for the broach retrieving device to advance the latter and thereby engage the broach with its actuating power device, said system also comprising means for permitting the retrieving device to be urged toward retracted position under the pressure of the broach.

Still another object of the invention is to devise a novel broaching machine, such as above described, wherein the operating cycle is automatic, thereby relieving the operator of the necessity for actuating the machine except to initiate each cycle thereof.

A further object of the invention is to provide an automatic control system for a broaching machine of the above type, comprising means for effecting a relatively slow initial return movement of the broach by the retriever device whereby the operator may apply a bushing to the large end of the broach before it is rapidly re-engaged with its actuating power device.

The foregoing and other objects and advantages of the invention will become apparent from a consideration of the following specification and the accompanying drawings, wherein:

Figure 2 is a sectional view through the broach centering device taken on the line 2—2 of Figure 1; and Figure 3 is an enlarged fragmentary view principally in central vertical section of the broach actuating chuck and the work table, with the chuck illustrated on the return or pullback stroke thereof.

Figure 1:
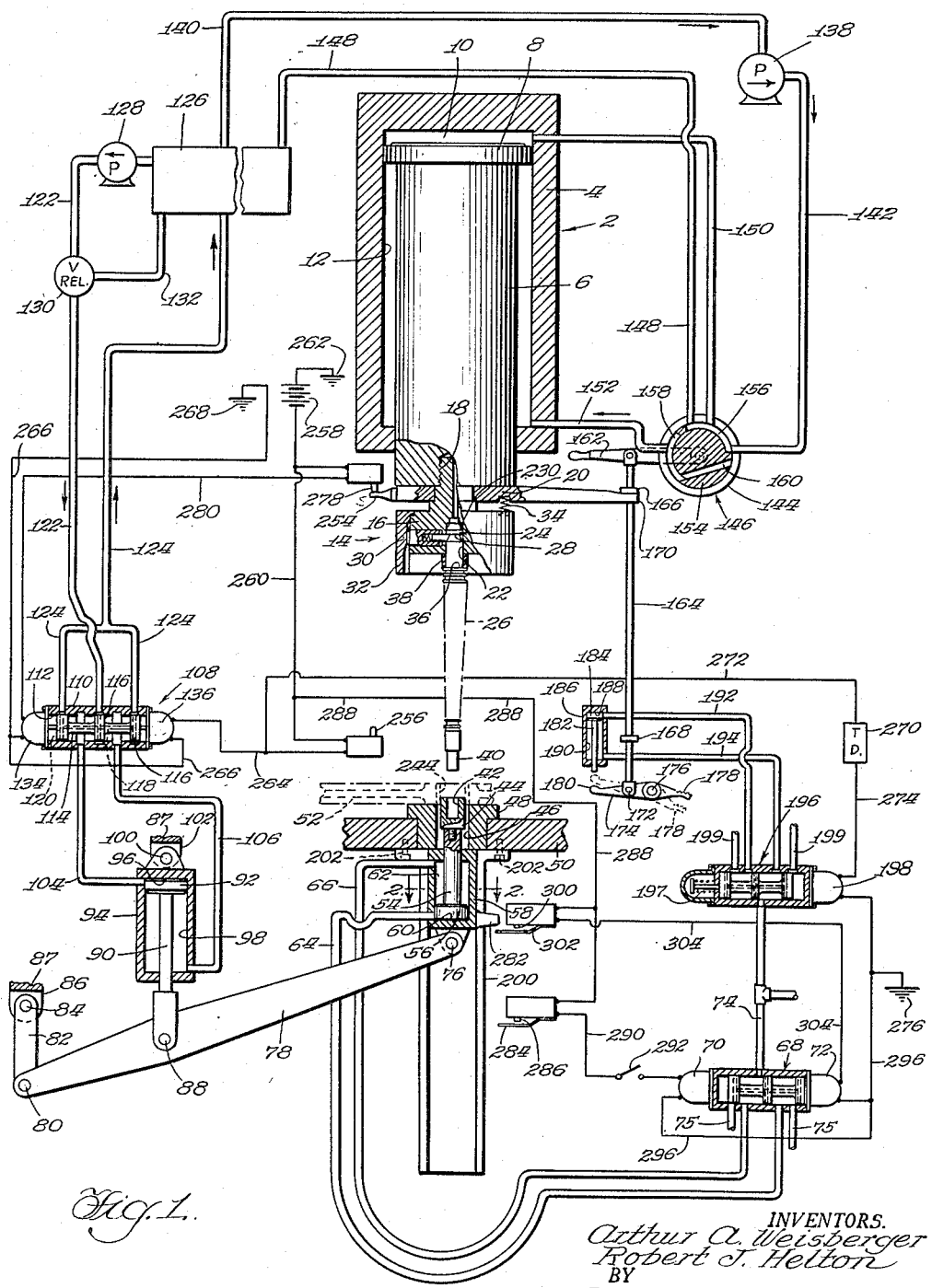
Figure 1 is a diagram of the hydraulic system and associated electrical actuating circuits for a broaching machine embodying the invention, the broaching machine being diagrammatically illustrated with portions broken away in vertical section to clarify the operation of the machine.

Describing the invention in detail and referring first to Figure 1, the novel broaching machine comprises a broach actuating power device, generally designated 2, which, in the illustrated embodiment of the invention, is in the form of an hydraulic motor comprising an hydraulic cylinder 4 and an hydraulic ram 6 reciprocal therein, the ram having a head 8 defining an advance chamber 10 and a return or pullback chamber 12 within the cylinder 4. The machine is illustrated in the form of a so-called vertical broaching machine, and the lower end of the ram 6 is provided with a broach engaging chuck mechanism, generally designated 14, comprising a pressure head 16 secured to the ram as by threaded engagement therewith at 18. The head 16 clamps a spring plate 20 against the lower end of the ram and is provided with a socket 22 adapted to receive a complementary nose or lug 24 on the upper or large end of a broach 26, the nose 24 comprising a recess 28 adapted to cooperate with an associated latch mechanism 30, hereinafter described in detail. The latch mechanism is resiliently urged to operating position by a collar 32 actuated by a spring 34 bearing against the under side of the plate 20.

The large end of the broach is provided with a shoulder 36 affording a seat for a bushing 38, and the small, lower end of the broach is provided with a nose or lug 40 adapted for reception within a complementary socket 42 of an associated centering chuck 44 disposed in predetermined alignment with the chuck 14 for a purpose hereinafter described in detail. The chuck 44 operates within an opening 46 of a work support member 48 carried by a table 50. The member 48 is adapted to support an associated work piece, indicated in phantom lines at 52.

The chuck 44 is connected to a piston rod 54 operated by a piston 56 reciprocal within a pneumatic cylinder 58 and defining advance and return chambers 60 and 62 therein. The advance chamber 60 is connected to a flexible advance line 64, and the return chamber 62 is connected to a flexible return line 66, said lines being connected to a conventional operating valve 68 which is operated, as hereinafter described in detail, by a pair of solenoids 70 and 72 whereby, in the advance position of the valve 68, pneumatic pressure delivered thereto by a supply line 74 is delivered to the advance line 64 and pneumatic fluid is exhausted from the return line 66 through an exhaust line 75. In the return or pullback position of the valve 68, pneumatic pressure fluid is delivered to the return line 66 and is exhausted from the advance line 64 through another exhaust line 75.

The lower end of the cylinder 58 is pivotally connected as at 76 to a lever 78 having a floating pivotal fulcrum as at 80 to a link 82 pivoted at 84 to a bracket 86 carried by the frame of the machine, fragmentarily indicated at 87. The lever 78 is pivotally connected intermediate its ends as at 88 to a piston rod 90 which is operatively connected to a piston 92 reciprocal within an hydraulic retriever cylinder 94 and defining advance and return chambers 96 and 98 therein. The upper end of the cylinder 94 is pivotally supported as at 100 from a bracket 102 of the machine frame 87. The piston 92 is operated to advance and retract the pneumatic fluid pressure device 56, 58 which operates the centering and retrieving chuck 44 for a purpose hereinafter described.

The piston 92 is operated by hydraulic fluid admitted to the advance chamber 96 by an advance line 104 and to the return chamber 98 by a return or pullback line 106. The lines 104 and 106 are connected to an operating valve, generally designated 108. The valve 108 is similar to the valve 68 and comprises a casing 110 having an internal cylindrical bore 112 receiving a stem 114 having a plurality of lands or spools 116 slidably fitted within the bore in substantially fluid-tight engagement therewith. The stem 114 comprises a longitudinal internal passage 118 communicating with ports 120 through the lands 116 in the neutral position of the valve stem 114. Thus in the neutral position of the stem, pressure fluid is delivered from a pressure line 122 to the bore 112 and thence to the passage 118 and ports 120 to an exhaust or discharge line 124 connected to a reservoir 126 of low pressure hydraulic fluid. The line 122 is supplied with pressure fluid by a pump 128 having its suction side connected to the tank 126 and having its discharge side connected to the line 122 which is provided with a conventional relief valve 130 adapted to open the line 122 to communication with the tank 126 through a relief line 132 whenever the pressure in the line 122 exceeds a predetermined operating value.

The stem 114 of valve 108 is shifted to advance position, as hereinafter described in detail, by a solenoid 136, whereupon pressure fluid is delivered by the line 122 to the advance line 104 and is exhausted from the return line 106 to the discharge line 124. In the return position of the stem 114 to which the latter is shifted by energization of a solenoid 134, pressure fluid is delivered by the line 124 to the return line 106 and is exhausted from the advance line 104 to the exhaust or discharge line 124.

The hydraulic motor 2 is operated by an hydraulic system comprising a pump 138 having its suction side connected by a line 140 to the hydraulic fluid in the tank 126. The discharge side of the pump 138 is connected by a pressure line 142 to the casing 144 of an operating valve, diagrammatically illustrated at 146. The casing 144 is connected to an exhaust or discharge line 148 connected to the tank 126, and the casing 144 is also connected to an advance line 150 communicating with the advance chamber 10 and is connected to a return line 152 connected to the return chamber 12.

The valve 146 comprises a rotor 154 within the casing 144, said rotor having a pair of peripheral notches or recesses 156 and 158 and having a transverse bore or port 160 connected to one end of the recess 158. The rotor 154 is operated by a lever 162 illustrated in Figure 1 in its neutral position, whereat pressure fluid is delivered by the pressure line 142 to the exhaust line 148. As the lever 162 is rotated clockwise as shown in the drawing, the rotor 154 is shifted to advance position whereat exhaust line 148 is open to communication with the line 152 by the notch 158, and the pressure line 142 is open to communication with the advance line 150 by the notch 156. Rotation of the lever 162 counterclockwise from its neutral position shown in the drawing actuates the rotor 154 to the return or pullback position thereof whereat the pressure line 142 is registered with the port 160 and thus communicates through the notch 158 with the return line 152, at the same time that the advance line 150 is open to communication with the exhaust line 148 by means of the notch 156.

The lever 162 is operated, as hereinafter described in detail, by an operating rod 164 carrying spaced collars 166 and 168. The rod is slidably fitted in a complementary opening through an operating arm 170 carried by the spring plate 20. The lower end of the rod 164 is pivoted at 172 to a control lever 174 pivoted at 176 to the machine frame and having a foot pedal 178 adapted for actuation by the operator's foot to initiate the cycle of the machine, as hereinafter discussed in connection with the operation thereof. The end of the lever 174 remote from the pedal 178 is provided with an abutment or bearing surface 180 adapted for engagement by a rod 182 of a piston 184 reciprocal in a pneumatic cylinder 186 and defining advance and return chambers 188 and 190 therein. The advance chamber 188 is connected to an advance line 192 and the return chamber 190 is connected to a return line 194, said lines being connected to a conventional operating valve 196 which is similar to valves 68 and 108 and is connected to the pneumatic supply line 74. The valve 196 is normally urged by a spring 197 to reverse position, whereat the line 74 is connected to the return line 194 and the advance line 192 is exhausted by an exhaust line 199; and the valve 196 is actuated to advance position, as hereinafter discussed, by a solenoid 198.

It will be understood that as the cylinder 58 is advanced toward the motor 2 and is retracted therefrom, the centering chuck 44 is maintained in predetermined alignment with chuck 14 by means of a guide bracket 200 removably secured as by screws 202 to the table 50. The bracket 200, as best seen in Figure 2, is afforded an accurate machined fit as at 204 with complementary guide surfaces formed on the cylinder 58. Thus movement of the cylinder 58 is accurately guided at all times to maintain the chucks 44 and 14 in predetermined alignment.

Referring now to Figure 3, the lower end of the ram 6 and the chuck mechanism 14 are shown in detail and it will be seen that the latch mechanism 30 comprises a cam member 206 having a slidable fit within a complementary chamber 208 of the head 16. In the advance position of the collar 32, shown in Figure 3, the mechanism 30 is maintained in operative position by engagement of the member 206 with an abutment surface 210 within the collar thereby compressing a spring 212 housed within the chamber 208 and reacting between the head 16 and the cam member 206. A latch member 214 is housed within the cam member 206 and is slidably interlocked therewith by a slot 216 in the latch member 214 and a pin 218 carried by the cam member 206. A spring 220 is also housed within the cam member 206 and reacts between the members 214 and 206 for urging them apart to expanded position, as shown in the drawings.

Thus it will be seen that the latch mechanism 30 comprises a resilient latch unit 206, 214 and 220 which extends into the socket 22 to engage the broach 26 within head 16. The latch unit is resiliently urged to inoperative position by the spring 212 which is compressed by the collar 32 in the operative position of the mechanism 30, as seen in Figure 3. It will be understood that as the collar 32 engages the work, the head 16 moves downwardly with respect to the collar 32 thereby compressing the spring 34 and permitting the member 206 to enter a recess 222 in the inner perimeter of the collar 32, whereby the spring 212 urges the latch mechanism 30 from the socket 22 to inoperative position thereby releasing the broach 26. On the return or pullback stroke of the ram 6, the spring 34 returns the collar 32 to the advance position shown in Figure 3 forcing a cam surface 224 of the cam member 206 inwardly along a complementary cam surface 226 of the collar 32 at the upper end of the recess 222. In the operative position of the latch mechanism 30, as shown in Figure 3, the member 214 is resiliently urged into the socket 22 by the spring 220 and presents a cam surface 228 engageable with a complementary conical cam surface 230 at the upper end of the nose 24, as the broach 26 is urged to engaged position with the chuck 14, as hereinafter described in connection with the operation of the machine. It will be understood that after the broach 26 has been urged to its extreme upward position within the socket 22, the latch 214 is snapped into the broach recess 28 by the spring 220 affording a positive lock for the broach until the latch mechanism 30 is released by the spring 212 as the collar 32 is actuated to release position whereat the member 206 enters the recess 222, as above described.

The detailed construction of the head 16 is shown in Figure 3 wherein it will be seen that the upper end of the socket 22 is provided with a recess 232 having a plug 234 of hard material, such as tool steel, adapted to bear against the upper end of the broach nose 24. The head 16 is also provided with a longitudinal passage 236 communicating with the recess 232 to afford a convenient conduit for a knock-out tool (not shown) utilized in the removal of the plug 234. The head 16 is preferably secured to the spring plate 20 as by one or more screws 238 to maintain the head and plate in assembled relationship during application and removal of the chuck mechanism 14 with respect to the ram 6. The lower end of the head is provided with an annular pad 240 of hard material, such as tool steel, adapted to engage the bushing 38 as the latter is pressed into the hole of the work piece, as is hereinafter described in connection with the operation of the machine.

As best seen in Figure 3, the work piece may comprise a boss 242 around the hole 244 therethrough, and to insure release of the broach by the latch mechanism 30, the lower end of the collar 32 is preferably provided with one or more removable lugs 246 secured thereto, as by a screw 248, and projecting into the collar 32 beneath the head 16. The lug 246 is adapted to engage the boss 242 on the advance stroke of the ram 6, and it will be noted that the radially inner surface of the lug 246 is registered with a complementary recess 250 within the head 16 affording clearance for the lug 246 as the collar is urged to release position, while the pad 240 presses the bushing 38 into the hole 244.

Describing the operation of the machine and the electrical actuating circuits associated with the above-described hydraulic circuits, as shown in Figure 1, the cycle of the machine is initiated by actuation of the pedal 178 to the position shown in phantom lines thereby rotating the rotor 154 of valve 146 clockwise to the advance position of the valve whereat pressure fluid is delivered to the advance chamber 10 and is exhausted from the return chamber 12 urging the ram 6 on the advance stroke thereof toward the work piece 52. Under these conditions the centering chuck 44 is in its advance position received within the opening 244 of the work piece, and the valve 108 is in its return position due to closing of a switch 278 by a ram arm 254, as hereinafter discussed in connection with the return stroke of the ram. As the ram moves on its advance stroke, the nose 40 of the broach 26 is engaged with the socket 42 of the chuck 44 thereby centering the broach and insuring a perfect cylindrical broached opening in the work piece. Thus the centering chuck 44 and the cylinder and piston device 58, 56 are urged to their retracted positions forcing fluid from the return chamber 98 of the cylinder 94 through the return line 106 and the pressure line 122 and thence through the relief valve 130 into the tank 126.

After the large end of the broach 26 has passed through the opening 244, the bushing 38 is pressed into place by the head 16. Thereafter, the arm 170 contacts the collar 168 to actuate the valve rotor 154 of the valve 146 to neutral position as the ram arm 254 carried by the spring plate 20 contacts a switch 256 closing a circuit through solenoid 136 which may be traced from a voltage supply 258 having one terminal thereof connected to a lead 260, the other terminal of said voltage supply being connected to ground as at 262. The lead 260 is connected to one terminal of the switch 256, the opposite terminal of which is connected to a lead 264 connected to one terminal of the solenoid 136, the opposite terminal of which is connected to a lead 266 which is connected at 268 to ground.

The circuit through solenoid 136 energizes the latter, which shifts the valve stem 114 of valve 108 to the right to the advance position thereof, whereat pressure fluid is delivered by the pressure line 122 to the advance line 104 and advance chamber 96 while fluid is exhausted from the return chamber 98 through the return line 106 and exhaust line 124 into the tank 126. Thus as the ram 6 dwells in the advance position thereof against the resistance of work 52 with the collar 32 in release position thereby releasing the latch mechanism 30 of the chuck 14, the piston 92 operating the lever 78 retracts the cylinder 58 of the broach retriever mechanism downwardly until the broach 26 is in the position illustrated in Figure 3 below the level of the work 52.

At this point, a conventional time delay device 270 in a branch lead 272 of lead 264 closes a circuit through the solenoid 198, one terminal of which is connected to a lead 274 connected to the time delay device 270, the opposite terminal of solenoid 198 being connected to ground as at 276. Energization of solenoid 198 shifts valve 196 to the advance position thereof whereat compressed air is delivered by the line 74 to the line 192 and is exhausted from the line 194 by the associated exhaust line 199, thereby actuating the piston 184 to engage the rod 182 with the abutment 180 of the lever 174, rotating the latter in a counterclockwise direction. As the lever 174 rotates, the lever 162 is likewise rotated in a counterclockwise direction under the action of piston 184 until the rotor 154 of valve 146 has reached the return or pullback position thereof whereat pressure fluid is delivered to the pullback chamber 12 and is exhausted from the advance chamber 10, whereupon the ram 6 moves upwardly on its return or pullback stroke. As the ram 6 moves on its pullback stroke, with the broach retracted from engagement with the chuck 14, as above described, the spring 34 advances the collar 32 to applied position thereby actuating the latch mechanism 30 of the chuck 14 to operative position, as above described. When the collar 32 has been retracted from the work piece, said work piece may be removed by the operator.

As the ram 6 moves upwardly, the switch 256 is opened breaking the circuits through solenoids 136 and 198. As the circuit through solenoid 198 is broken, the valve 196 is automatically shifted by spring 197 to return position, whereat pressure fluid is delivered by the line 74 to the return line 194 and is exhausted from the advance line 192 through the exhaust line 199.

When the ram 6 reaches the top of its stroke, the arm 170 engages the collar 166 shifting the rotor 154 of valve 146 to neutral position, and the arm 254 closes a switch 278 establishing a circuit from the voltage supply 258 through the switch 278 and a lead 280 which is connected to one terminal of the solenoid 134, the opposite terminal of which is connected to the beforementioned lead 266 which is connected at 268 to ground. Energization of solenoid 134 actuates the valve 108 to return position whereat pressure fluid is delivered by the pressure line 122 to the return line 106 and is exhausted from the advance line 104 to the exhaust line 124, whereupon the piston 92 is urged upwardly on its return stroke moving the cylinder 58 upwardly on advance stroke within the guide bracket 200. As the cylinder 58 and chuck 44 move upwardly, the operator may place a new bushing 38 on the broach preparatory to initiation of a new cycle.

As the cylinder 58 moves upwardly on its advance stroke toward the motor 2, an arm or lug 282 on the cylinder engages an actuating spring 284 of a normally open snap action precision switch 286 momentarily closing the latter thereby establishing an electrical circuit which may be traced from the voltage supply 258 to the lead 260 and a branch lead 288 thereof which is connected to one terminal of the switch 286, the opposite terminal of which is connected to a lead 290 containing a normally closed switch 292. The lead 290 is connected to one terminal of the solenoid 70, the opposite terminal of which is connected to a lead 296 which is connected to ground as at 276. Energization of solenoid 294 shifts the valve 68 to advance position whereat pressure fluid is delivered to the line 64 and is exhausted from the line 66 by the associated exhaust line 75 connected to the valve. Thus the piston 56 is advanced rapidly within the pneumatic cylinder 58 advancing the piston 56 toward the chuck 14 as the cylinder 58 is advanced toward the chuck by the lever 78 and its operating piston 92. With the piston 56 at the top of its stroke relative to the cylinder 58, the nose 24 of the broach is spaced below the latch mechanism 30, a distance approximately equivalent to the distance between switch 286 and a switch 300 operated by a spring 302. Thus with the piston 58 at the top of its stroke, the cylinder 58 is advanced upwardly by the lever 78 to engage the broach nose 24 with the latch mechanism 30, whereupon the lug 282 engages the spring 302 momentarily actuating the normally open switch 300 closing a circuit through the solenoid 72 which may be traced from the voltage supply 258 to the lead 260 and the branch lead 288 which is connected to one terminal of the switch 300, the opposite terminal of which is connected to a lead 304 which is connected to one terminal of the solenoid 72, the opposite terminal of which is connected to the lead 296 which, as above noted, is connected at 276 to ground. Thus actuation of switch 300 energizes solenoid 72 which actuates the valve 68 to return position thereof whereat pneumatic pressure fluid from the line 74 is directed to the return line 66 and pressure fluid in the advance line 64 is exhausted through the associated exhaust line 75, thereby retracting piston 56 and chuck 44 to the position shown in Figure 1 preparatory to insertion of another work piece and initiation of a new cycle by the operator.

In the event that the operator desires to terminate operation of the machine at the end of any cycle thereof, the switch 292 may be opened thereby preventing the closing of a circuit through solenoid 70 upon actuation of the switch 286. Thus at the top of the advance stroke of the cylinder 58, the broach nose is spaced below the chuck 14, whereupon the operator may remove the broach for the purpose of terminating operation of the machine or to substitute a new broach, if desired.

We claim:

1. A machine of the class described, comprising a fluid motor including cylinder means and ram means presenting spaced advance and return areas therein, a chuck carried by said ram means comprising a pressure head with a socket adapted to receive one end of an associated tool, a collar on said head, spring means for urging said collar to an advance position on said head, tool engaging means carried by said head and communicating with said socket, said collar being operatively connected to said engaging means for holding the same in operative position when said collar is in advance position and for releasing said engaging means when said collar is in retracted position relative to said head, a table adapted to support an associated work piece and having a tool receiving opening, a fluid pressure device beneath said opening comprising a cylinder member and a piston member therein, tool engaging means carried by one of said members and adapted in advance position of said device to project through said hole in predetermined alignment with said chuck, a second fluid motor operatively connected to said device for advancing and retracting the same relative to said ram, and automatic control means comprising valve means for alternately delivering pressure fluid to and exhausting pressure fluid from respective areas, means for shifting said valve means to advance position thereof whereat pressure fluid is delivered to said advance area and is exhausted from said return area, means for automatically shifting said valve means to neutral position when said ram means reaches advance position relative to said table, means for automatically actuating said second fluid motor to retract said device when said ram reaches advance position, means for automatically shifting said valve means to return position at a predetermined time interval subsequent to actuation of said second motor, means for automatically actuating said second motor to advance said device when said ram reaches return position, and means for automatically actuating said device first to advance and then to retracted position thereof as said second motor actuates said device on the advance stroke thereof.

2. A machine of the class described, comprising a fluid motor including cylinder means and ram means presenting spaced advance and return areas therein, a chuck carried by said ram means comprising releasable latch means adapted to interlock an associated tool with said chuck, a table adapted to support an associated work piece and having a tool receiving opening, a fluid pressure device beneath said opening, tool engaging means operatively connected to said device and adapted in the advance position of said device to project through said hole, a second fluid motor operatively connected to said device, and automatic control means comprising valve means for alternately delivering pressure fluid to and exhausting pressure fluid from respective areas, means for shifting said valve means to advance position thereof whereat pressure fluid is delivered to said advance area and is exhausted from said return area, means for automatically shifting said valve means to neutral position when said ram means reaches advance position relative to said table, means for releasing said latch means in said advance position of said ram means, means for automatically actuating said second fluid motor to retract said device when said ram means reaches said advance position thereof, means for automatically shifting said valve means to return position thereby directing pressure fluid to said return area and exhausting pressure fluid from said advance area at a predetermined time interval subsequent to actuation of said second motor, means for automatically actuating said second fluid motor to advance said device when said ram means reaches return position, and means for automatically actuating said device to advance position thereof as said device is advanced by said second motor to re-engage an associated tool with said latch means, and means for thereafter automatically actuating said device to retracted position thereof.

3. A broaching machine comprising a work support, a broach operating chuck having releasable means for engaging an associated broach, power means for advancing said chuck toward said support and for retracting said chuck from said support, a centering chuck opposed to said operating chuck, said centering chuck being adapted in advance position to engage and center an associated broach actuated by said operating chuck and being adapted to retract under the thrust of said broach, and operating means independent of the first-mentioned means for returning said centering chuck to advance position upon retraction of said operating chuck, said operating means comprising a pair of fluid pressure motors arranged in series, said motors being formed and arranged, upon actuation of both, to engage said broach with said operating chuck.

4. A broaching machine comprising a broach operating chuck, a broach having broaching means extending lengthwise from a point adjacent one end thereof to a point adjacent the opposite end thereof, releasable latch means carried by the chuck for interlocking said opposite end of said broach therewith, means for advancing and retracting said chuck, a work support adapted to support an associated work piece, a centering chuck, means for advancing and retracting the centering chuck with respect to the operating chuck, said centering chuck being adapted in advanced position thereof to engage the first mentioned end of said broach and to thereby maintain the broach in predetermined alignment with respect to said work piece, and means carried by the operating chuck and engageable on advance stroke thereof directly with the work piece for automatically releasing said latch means.

5. A machine of the class described, comprising a tool operating chuck, motor means operatively connected thereto for advancing and retracting the same, releasable tool engaging means carried by said chuck, another chuck opposed to the first-mentioned chuck, a pneumatic pressure device operatively connected to said other chuck for advancing and retracting the latter relative to the first-mentioned chuck, hydraulic motor means independent of the first-mentioned motor means and operatively connected to said device for advancing and retracting the latter as a unit relative to the first-mentioned chuck, and means carried by the first-mentioned chuck and engageable with an associated work piece in the advance position of the first-mentioned chuck to release said tool engaging means.

6. A machine of the class described, comprising a fluid motor including cylinder means and ram means presenting spaced advance and return areas therein, a chuck carried by said ram means and comprising releasable latch means for engaging an associated tool with said chuck, an opposed centering chuck spaced from the tool in retracted position of said ram means, a fluid pressure device having cylinder and piston members, one of said members being operatively connected to said centering chuck for advancing and retracting the same relative to said ram means, and a second fluid motor independent of the first-mentioned motor and operatively connected to the other member of said device for advancing and retracting the same as a unit with respect to said ram means.

7. A broaching machine comprising a broach operating chuck, a broach having broaching means extending lengthwise thereof from one end thereof and having bushing support means at the opposite end thereof, releasable latch means carried by the chuck for interlocking said opposite end of said broach therewith, motor means for advancing and retracting said chuck, a work support adapted to support an associated work piece, a centering chuck, means for advancing and retracting the centering chuck with respect to the operating chuck, said centering chuck being adapted in advanced position thereof to engage and maintain the broach in predetermined alignment with respect to said work piece, and means carried by the operating chuck and engageable on the advance stroke thereof with the work piece for automatically releasing said latch means.

8. A broaching machine comprising a frame and a hydraulic motor including cylinder means and ram means defining advance and return chambers therein, one of said means being fixed with respect to the frame, a broach operating chuck operatively connected to the other of said means, a centering chuck adapted in advanced position to engage and center an associated broach, said operating chuck having releasable latch means for engaging said broach, and motor means including cylinder and piston members, one of which is anchored to the frame, an expandable fluid pressure device connected to the other of said members, said device being operatively connected to the centering chuck for actuation thereof.

9. A machine of the class described, comprising a chuck adapted to operate an associated tool, hydraulic motor means connected to said chuck for advancing and retracting the same, a centering chuck opposed to the first-mentioned chuck, a pneumatic fluid pressure device operatively connected to said centering chuck for advancing and retracting the latter relative to the first-mentioned chuck, and hydraulic motor means independent of the first motor means and operatively connected to said device for advancing and retracting the latter as a unit with respect to the first-mentioned chuck.

10. A broaching machine comprising a frame and a hydraulic motor including cylinder means and ram means defining advance and return chambers, one of said means being anchored to the frame, a broach operating chuck operatively connected to the other of said means, releasable latch means carried by said chuck for engaging an associated broach, a reciprocal centering chuck opposed to the operating chuck, a fluid pressure device comprising piston and cylinder elements, one of which is operatively connected to the centering chuck, and motor means comprising cylinder and piston members, one of said members being anchored to the frame and the other of said members being operatively connected to the other element of said device for reciprocating the latter and thereby reciprocating the centering chuck.

11. A broaching machine comprising a work support, opposed chucks, means for positively guiding said chucks in predetermined alignment with respect to said support, and means for advancing and returning each chuck with respect to the other, the means associated with one chuck being independent of the means associated with the other chuck and comprising a pair of fluid motors arranged in series, the other chuck comprising releasable broach engaging means, and means for releasing said engaging means in advance position of said other chuck.

ARTHUR A. WEISBERGER.
ROBERT J. HELTON.

References Cited in the file of this patent

UNITED STATES PATENTS

| Number | Name | Date |
|---|---|---|
| 1,823,975 | Ferris | Sept. 22, 1931 |
| 1,905,164 | Ferris | Apr. 25, 1933 |
| 1,937,121 | La Pointe | Mar. 28, 1933 |

FOREIGN PATENTS

| Number | Country | Date |
|---|---|---|
| 151,364 | Great Britain | Sept. 28, 1920 |
| 440,852 | Great Britain | Jan. 7, 1939 |
| 479,870 | Great Britain | Feb. 14, 1938 |